Figure 1:
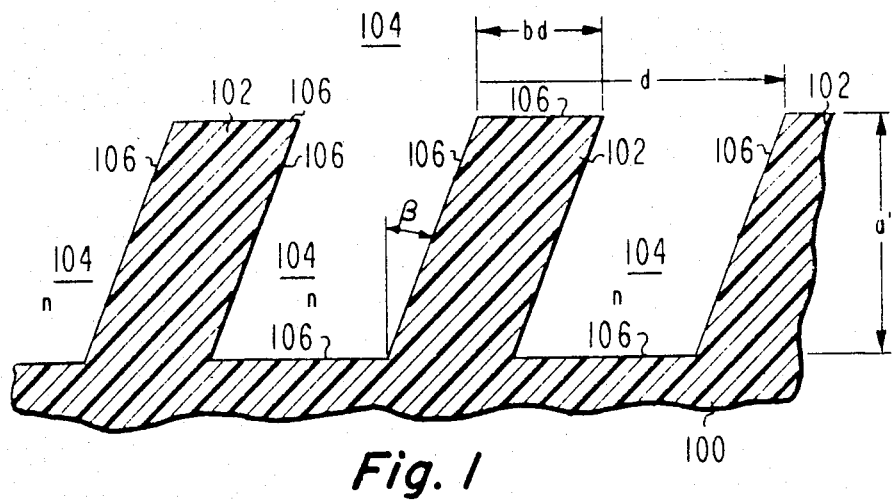

United States Patent [19]

Knop

[11] Patent Number: 4,506,949
[45] Date of Patent: Mar. 26, 1985

[54] DIFFRACTIVE COLOR SEPARATION FILTER

[75] Inventor: Karl H. Knop, Zurich, Switzerland

[73] Assignee: RCA Corporation, New York, N.Y.

[21] Appl. No.: 498,763

[22] Filed: May 27, 1983

[51] Int. Cl.³ ............................................. G42B 5/18
[52] U.S. Cl. .............................. 350/162.19; 350/314; 358/55
[58] Field of Search ...................... 350/162.17, 162.19, 350/311, 314; 358/55, 213, 250, 253

[56] References Cited

U.S. PATENT DOCUMENTS

| | | | |
|---|---|---|---|
| 3,957,354 | 5/1976 | Knop | 350/162.19 |
| 4,130,347 | 12/1978 | Knop | 350/162.19 |
| 4,255,019 | 3/1981 | Knop | 350/162.2 |
| 4,318,123 | 3/1982 | Knop | 358/55 |

OTHER PUBLICATIONS

"Color Separation Gratings," Appl. Optics 17, 2273–2279, (1978), by H. Dammann.
"Spectral Characteristics of Stepped-Phased Gratings," Optik 53, 409–417, (1979), by H. Dammann.

Primary Examiner—Bruce Y. Arnold
Assistant Examiner—William Propp
Attorney, Agent, or Firm—Joseph S. Tripoli; George E. Haas; George J. Seligsohn

[57] ABSTRACT

The use of a rhomboid-shaped phase grating to derive, from polychromatic input light, plus-one, minus-one and zero diffraction order output beams each of a different independent color.

11 Claims, 5 Drawing Figures

DIFFRACTIVE COLOR SEPARATION FILTER

This invention relates to an improved diffractive color separation filter and, more particularly, to such a filter comprised of a phase grating having rhomboid-shaped diffraction elements.

Color separation filters are used in color television cameras for analyzing the three spectral bands representing the red, green, and blue content of an imaged scene. Such filters are also employed by the printing industry to extract from a color picture the various color components which then are printed with the corresponding dyes in superposition. Another application of color separation filters can be found in integrated and waveguide optics. In wavelength multiplexing, different channels of information are transmitted over the same optical fiber by assigning each optical fiber a specific wavelength or wavelength range. At the end of the fiber, the channels are demultiplexed by wavelength separation. A color separation filter may be used for this task of wavelength separation.

There are three basic types of color separation filters. A first type makes use of absorptive dyes. Such absorptive color filters are commonly employed as stripe filters in color-encoding television cameras, such as is disclosed in my U.S. Pat. No. 4,318,123, which issued Mar. 2, 1982. Another type of color separation filter, commonly employed in color television cameras that have separate red, green, and blue imaging channels (and therefore do not require color-encoding), are dielectric interference filters. As known, a dielectric interference filter consists of a stack of alternating high and low refractive index material thin films with well defined thicknesses. Therefore, dielectric interference filters are relatively expensive, but they offer—at least in principle—the possibility of 100 percent optical efficiency. The light which is not transmitted through the filter is reflected and then can be used too. In contrast, with absorption filters, which cost less, only the transmitted light is used, and the remaining light is absorbed in the dye and is therefore lost.

There are various known approaches for employing a diffraction grating as a color separation filter. The first approach is to use the dispersive power of the diffraction grating to separate different wavelengths. In this approach, use is made of the dependence of the diffraction angle $\alpha$ (in the first diffraction order) with wavelength $\lambda$ and the grating line-spacing d (sin $\alpha = \lambda/d$). A disadvantage of this first approach is that it is very difficult to achieve high efficiency in the selected diffraction order for all the different relevant wavelengths. Generally, a substantial part of the light will be lost into the unused diffraction orders. Also, for good angular separation of the different wavelengths, very fine gratings with small periods are required. A second approach is to employ diffraction gratings making use of the diffractive subtractive color filtering techniques disclosed in my U.S. Pat. No. 3,957,354, which issued May 18, 1976, and my U.S. Pat. No. 4,130,347, which issued Dec. 19, 1978. The illumination of a rectangular-shaped diffraction element phase grating with a beam of input white light results in the derivation of respective angularly separated beams of zero diffraction order and plus and minus higher diffraction order output light, with the zero diffraction order output light exhibiting a specified color spectrum. Because of the symmetry of a rectangular-shaped diffraction element phase grating, the color spectrums of the respective plus and minus beams of any given (e.g. the first) diffraction order output light are the same as one another (although they are different from the given color spectrum of the zero diffraction order). Therefore, a phase grating employing symmetrically-shaped, diffraction elements cannot be used to derive three independent color spectrums for the zero diffraction order, the plus one diffraction order and the minus one diffraction order.

However, H. Damman, in his article "Color Separation Gratings," Appl. Optics 17, 2273–2279 (1978) and in his aritcle "Spectral Characteristics of Stepped-Phased Gratings," Optik 53, 409–417 (1979), has proposed phase gratings with a step profile to generate the primary colors red, green, and blue in the three lowest diffraction orders. Typically, each step in his profile is approximately one micrometer high. At least two steps are required. Phase gratings of this type, where the grating period is much larger than the depth, can easily be fabricated. Unfortunately, however, it is very difficult to fabricate fine gratings of this type. In most practical applications, fine gratings are required. In the limit, the period becomes comparable to the wavelength of light and scaler diffraction theory, on which Damman's gratings are based, fails anyhow.

The present invention is directed to a class of phase diffraction gratings which produce significantly different color spectrums for the zero, plus one and minus one diffraction orders, which phase diffraction gratings are easy to fabricate even when the grating period becomes small. An ideal application for phase diffraction gratings incorporating the principles of the present invention is for use in a stripe filter of the type of color-encoding television camera disclosed in my U.S. Pat. No. 4,255,019, which issued Mar. 10, 1983, in which the stripe filter is comprised of a phase grating in combination with a lenticular array. Other uses in other types of television cameras and for waveguide optics can be envisioned.

Figure 2:
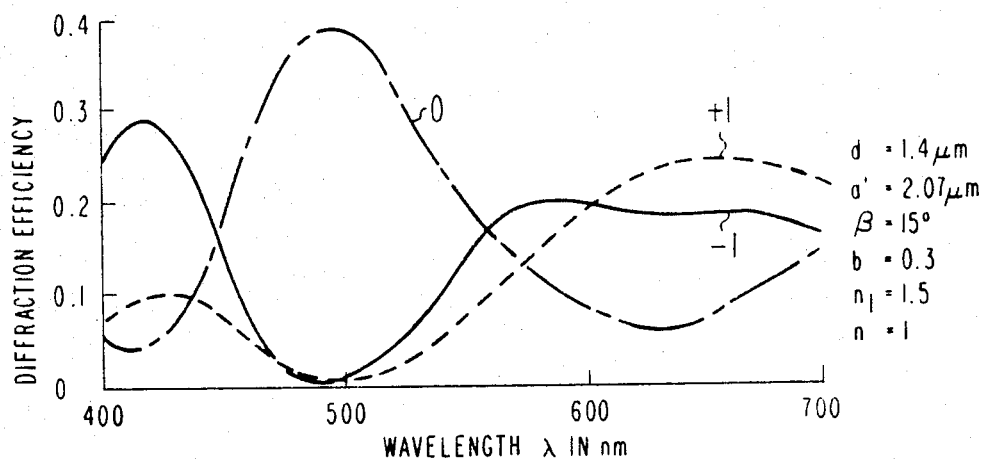
Figure 3:
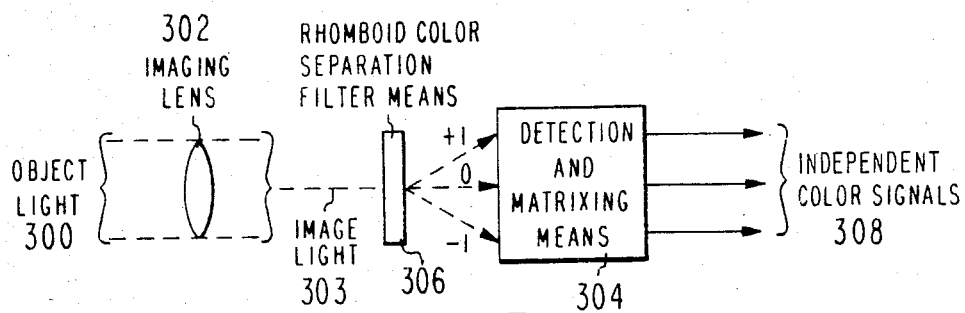
Figure 4:
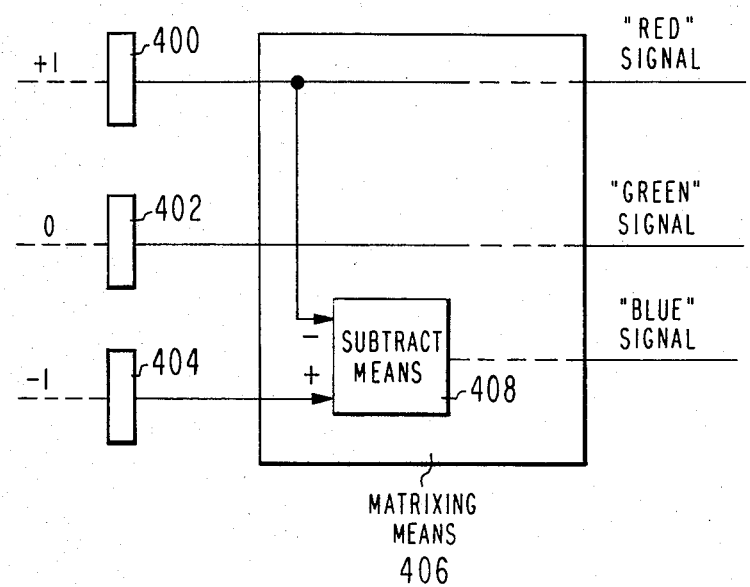
Figure 5:
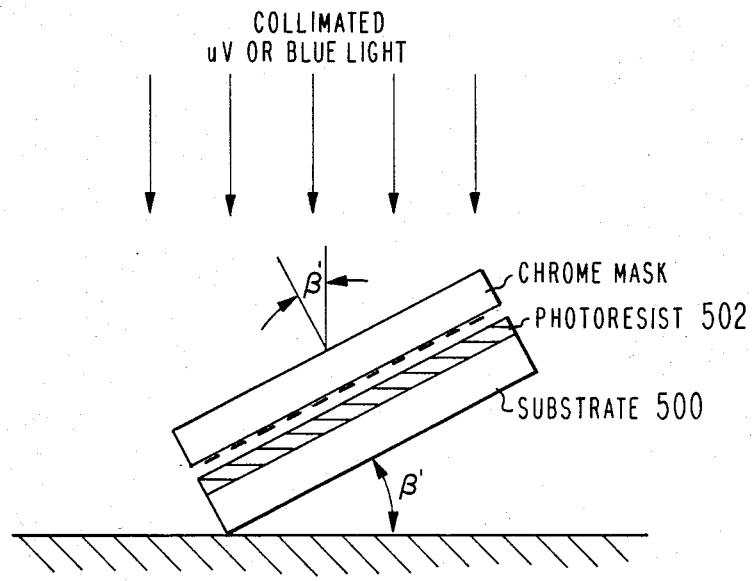

More specifically, the present invention is directed to a diffractive color separation filter comprised of a phase grating defined by periodically-spaced, rhomboid-shaped diffraction elements having a spacing period d, an optical amplitude a, an aspect ratio b and a slant angle $\beta$ with respect to the normal to to the surface of the grating, wherein the respective values of the free-space wavelength $\lambda$ of the given spectrum of a polychromatic input light illuminating the filter, d, a, b, and $\beta$ are related by the following expressions:

$2 < d/\lambda < 6$
$0.5 < a\lambda/ < 5$
$0.1 < b < 0.9$
$0 < \beta < 2\lambda/d$ In the drawings:

FIG. 1 is a diagram of a phase grating incorporating the principles of the present invention;

FIG. 2 comprises respective plots of the diffraction efficiency of the zero diffraction order the plus one diffraction order and the minus one diffraction order over the visible spectrum for a particular example of the phase grating shown in FIG. 1;

FIG. 3 is a functional block diagram of optical apparatus, such as a color television camera, using a color separation filter means incorporating the present invention;

FIG. 4 is a functional block diagram of one embodiment of the detection and matrixing means of FIG. 3, which can be used with the particular example of a color separation filter incorporating the present invention which has the wavelength filtering properties shown in the plots of FIG. 2, and FIG. 5 illustrates a technique for fabricating a master for embossing phase-grating surface relief patterns having rhomboid-shaped diffraction elements.

Referring to FIG. 1, there is shown a phase grating comprised of periodically-spaced, rhomboid-shaped diffraction elements. In the embodiment of the present invention shown in FIG. 1, the phase grating is embossed as a surface relief pattern in a given material 100. The respective diffraction elements 102 of the phase grating all have rhomboid shapes of substantially identical configurations and sizes. As indicated in FIG. 1, the grating spacing period is d and the width of each diffraction element 102 is bd (where b is the fraction defining the aspect ratio or duty cycle of each of diffraction elements 102). Further, each rhomboid-shaped diffraction element 102 has substantially the same physical amplitude a' and substantially the same slant angle $\beta$ with respect to the normal to phase grating.

As known in the art, surface relief pattern phase gratings operate in an ambient light-transmissive medium 104 exhibiting an index-of-refraction n. Usually medium 104 is air having an index-of-refraction of n substantially equal to unity. However, in some cases ambient medium 104 is comprised of an overcoat material having an index-of-refraction n that is greater than unity.

The optical properties of a color-filter phase grating depend on its optical amplitude a rather than its physical amplitude a'. Phase gratings may be either reflective phase gratings or tranmissive phase gratings. In the case of a reflective phase grating, the surface 106 of given material 100 reflects incident light traveling in ambient medium 104, and the relationship between optical amplitude a and physical amplitude a' is given by the following expression:

$$a' = a/2n \quad (1)$$

In the case of transmissive phase gratings, a given transparent material 100 transmits light therethrough. Transparent material 100 has an index-of-diffraction $n_1$ with a value greater than the unity which is different from that of n. The input light incident on the transmissive phase grating travels through transparent material 100 either to or from medium 104. In either case, the relationship between the optical amplitude a and the physical amplitude a' of a transmissive phase grating is given by the following expression:

$$a' = a/|n_1 - n| \quad (2)$$

In practice, transparent material 100 employed in a transmissive phase grating is generally a thermo-plastic material exhibiting an index-of-fraction $n_1$ having a value of about 1.5. The surface relief pattern comprising diffractive elements 102 can be either hot-pressed or cast in the thermoplastic material. In this case, medium 104 is usually air having an index-of-refraction of unity or is an overcoat material. The overcoat material usually has an index of refraction substantially different from 1.5

It has been found that a reflective or transmissive phase grating structure in accordance with FIG. 1 (i.e. incorporating periodically-spaced rhomboid-shaped diffraction elements) has the potential to effectively diffract an incident beam of polychromatic light into respective $+1$, zero and $-1$ diffraction order output light beams with different intensity ratios which are a strong function of wavelength $\lambda$ of the spectrum of the input beam of polychromatic light, if the relationships among the wavelength $\lambda$, the line spacing period d, the optical amplitude a, the aspect ratio b, and the slant angle $\beta$ of the rhomboid-shaped diffraction elements with respect to the normal to the phase grating, conform to the following expressions:

$$2 < d/\lambda < 6 \quad (3)$$

$$0.5 < a/\lambda < 5 \quad (4)$$

$$0.1 < b < 0.9 \quad (5)$$

$$0 < \beta < 2\lambda/d \quad (6)$$

FIG. 2 illustrates the respective measured spectra of the zero, the $+1$ and the $-1$ diffraction order output beams of a fabricated example of a transmissive phase grating structured in accordance with FIG. 1 and having respective values of d, a', $\beta$, b, $n_1$, n listed in FIG. 2. As indicated in FIG. 2, the zero diffraction order output light beam contains a relatively large amount of green light (approximately 500 nm in wavelength) and a relatively small amount of blue light (about 400 nm in wavelength) and a relatively small amount of red light (600–700 nm in wavelength). Both the $+1$ and $-1$ diffraction order output light beams differ from the zero diffraction order output light beam by containing only a negligible amount of green light. Further the $+1$ diffraction order output light beam contains much less blue light and slightly more red light than does the $-1$ diffraction order output light beam.

FIG. 3 is a functional block diagram of optical apparatus, such as a color television camera, incorporating a rhomboid color separation filter of the type discussed in connection with FIG. 1. More specifically, object light 300, imaged by imaging lens 302 derives image light 303 (indicated by its center line) for detection and matrixing means 304. In the path of image light 303 is rhomboid color separation filter means 306. Means 306 incorporates a periodically-spaced, rhomboid-shaped transmissive or reflective phase grating of the type discussed in connection with FIG. 1, and may also incorporate other optical means. For instance, rhomboid color separation filter means 306 may include a lenticular lens array in cooperative spatial relationship with a rhomboid-shaped phase grating to form a "color-encoding" stripe filter of the type disclosed in my U.S. Pat. No. 4,255,019. In this case, detection and matrixing means 304 utilizes one or two imagers for deriving three independent color signals 308 from the zero, $+1$, and $-1$ diffraction order output light beams from rhomboid color separation filter means 306. Alternatively, the detection and matrixing means 304 may include three separate imagers respectively responsive to separate ones of the zero $+1$, and $-1$ diffraction order output light beams from color separation filter means 306.

The matrixing portion of detection and matrixing means 304 may include attenuators, amplifiers, summers, and/or subtractors operating on respective detected signals derived from the zero, $+1$, and $-1$ diffraction order output light beams to derive each of the three independent color signals 308. For an illustrative case, reference is made to FIG. 4, which is a functional block diagram of an embodiment of detection and matrixing means 304 for use with the example of a rhomboid-shaped transmissive phase grating discussed in connection with FIG. 2. As indicated in FIG. 4, the respective +1, zero, and −1 diffraction order output light beams are separately detected by detector means 400, 402, and 404 and matrixing means 406 includes a "red" signal channel, a "green" signal channel, and a "blue" signal channel. Each of these three channels may include attenuators and/or amplifiers (indicated by the dashed lines) to effect normalization of the relative amplitudes of the "red", "green" and "blue" signal outputs from matrixing means 406. The "red" signal output is derived soley from detection means 400 in response to detection of the +1 diffraction order output light beam. Similarly, the "green" signal output is derived solely from detection means 402 in response to the detection of the zero diffraction order output light beam. However, the "blue" signal output is derived from the output of subtract means 408, which serves to subtract the detected +1 diffraction order output light signal from detection means 400 from the detected −1 diffraction order light beam signal from detection means 404.

A comparison of the +1 and the −1 diffraction spectra of FIG. 2 makes it plain that the difference signal output from subtract means 408 represents the blue component of object light 300. This is true because (1) the green portion of the +1 and −1 diffraction spectra of FIG. 2 are both negligible, and (2) the difference between the large red portion of the −1 diffraction order spectrum and the somewhat larger red portion of the +1 diffraction order spectrum is relatively small. Therefore, only the blue component of object light 300 contributes materially to the difference signal output from subtract means 408 because the blue portion of the +1 diffraction order spectrum is much smaller than the blue portion of the −1 diffraciton order spectrum. Further, the red portion of the +1 diffraction order spectrum is much larger than the relatively small blue portion thereof. Therefore, the intensity of the +1 diffraction order spectrum is primarily determined by the red component of object light 300. Similarly, the intensity of the zero diffraction order spectrum is primarily determined by the green component of object light 300. Thus, the "red" signal output represents the red component of object light 300; the "green" signal output represents the green component of object light 300, and the "blue" signal output represents the blue component of object light 300.

The maximum errors in the parameters a′ and b which can be tolerated without noticeable color distortion is only a few percent. However, parameters d and $\beta$ are somewhat less critical. Utilizing the particular values of parameters shown in FIG. 2 results in a relatively small diffraction angle of the order of 20°. This makes the use of low f-number imaging lens systems in the FIG. 3 arrangement relatively easy.

One of the benefits of the present invention is that an appropriate master can be used to inexpensively emboss accurate replicas of a desired rhomboid-shaped phase gratings in thermoplastic material (such as polyvinylchloride). FIG. 5 illustrates a technique for fabricating an embossing master. As shown in FIG. 5, a substrate 500 is coated with a layer of photoresist 502. This layer of photoresist has a thickness equal to the desired physical amplitude a′. The resist 502 is exposed through a chrome grating mask (spacing d) with well collimated ultra-violet or blue light oriented at an angle $\beta'$ with respect to the normal to the surface of photoresist 502.

If $n_p$ is the index-of-diffraction of photoresist 502, the slant angle $\beta$ is related to the angle $\beta'$ prime of the following expression:

$$\sin \beta = \sin \beta'/n_p \qquad (7)$$

Development of the exposed photoresist, results in substrate 500 and photoresist 502 defining the desired profile of a rhomboid-shaped relief grating pattern. As known in the art, electroless and electroplating techniques can then be used to build up a nickel master from the relief grating pattern formed by substrate 500 developed photoresist 502.

An alternative technique for producing the slanted rhomboid-shaped grating profile is to employ ion beam etching. Here, preferential etching and a well defined direction (which corresponds to the slant angle) is achieved with a collimated beam of ions.

Regardless of how the nickel master is fabricated, it is desirable to cover the nickel with a thin film of a material such as teflon when embossing gratings with rhomboid-shaped profiles in thermoplastic materials, in order to ensure proper release of the master from the embossed structure.

What is claimed:

1. A diffractive color separation filter responsive to illumination with polychromatic input light having a given spectrum of free-space wavelength $\lambda$ for deriving respective angularly-separated zero diffraction order, plus-one diffraction order, and minus-one diffraction order output light beams, wherein the wavelength spectrum of each of said respective output light beams is significantly different from one another, said filter comprising;

a phase grating defined by periodically-spaced rhomboid-shaped diffraction elements having a spacing period d, an optical amplitude a, an aspect ratio b and a slant angle $\beta$ with respect to the normal to said grating, wherein the respective values of $\lambda$, d, a, b, and $\beta$ are related by the following expressions:

$2 < d/\lambda < 6$
$0.5 < a/\lambda < 5$
$0.1 < b < 0.9$
$0 < \beta < 2\lambda/d$.

2. The filter defined in claim 1, wherein said phase grating is formed by a surface relief pattern in a given material, said surface relief pattern defining said periodically-spaced, rhomboid-shaped diffraction elements.

3. The filter defined in claim 2, wherein said surface relief pattern is formed by a reflective surface of said given material, wherein said surface relief pattern is in contact with a medium having an index-of-refraction n through which said input light and said output light travel, and wherein the physical amplitude a′ of said surface relief pattern is substantially equal to a/2n, whereby said phase grating operates as a reflective grating.

4. The filter defined in claim 3, wherein said medium is air having index-of-refraction n substantially equal to one.

5. The filter defined in claim 2, wherein: said given material is transmissive and has an index-of-refraction $n_1$, greater than one, through which said input light travels; said surface relief pattern is in contact with a medium having an index-of-refraction n, that is different from $n_1$, through which said output light beams travel; and the physical amplitude a′ of said surface relief pattern is substantially equal to $a/|n_1-n|$, whereby said phase grating operates as a transmissive grating.

6. The filter defined in claim 5, wherein said medium comprises an overcoat material having an index-of-refraction $n$, greater than one, but different from that of $n_1$.

7. The filter defined in claim 5, wherein said medium comprises air having an index-of-refraction n substantially equal to one.

8. The filter defined in claim 7, wherein said given spectrum extends from 400 to 700 nanometers, d is substantially equal to 1.4 micrometers, a' is substantially equal to 2.07 micrometers, b is substantially equal to 0.3 and $\beta$ is substantially equal to 15°.

9. Optical apparatus responsive to illumination thereof with input polychromatic light having a given spectrum of free-space wavelength $\lambda$ for deriving three substantially independent color signals representing said given spectrum, said apparatus comprising:

a phase grating defined by periodically-spaced diffraction elements having a spacing period d, an optical amplitude a, an aspect ratio b and a slant angle $\beta$ with respect to the normal to said grating, wherein the respective values of $\lambda,d,a,b,$ and $\beta$ are related by the following expressions:

$2 < d/\lambda < 6$
$0.5 < a/\lambda < 5$
$0.1 < b < 0.9$
$0 < \beta < 2\lambda/d;$ said phase grating deriving respective angularly-separated zero diffraction order, plus-one diffraction order, and minus-one diffraction order output light beams in response to the illumination thereof with said input polychromatic light, wherein the wavelength spectrum of each of said respective output light beams is significantly different from one another; and detection and matrixing means responsive to said respective output light beams for deriving each of said three independent color signals in accordance with said different spectrums of said respective output light beams.

10. The optical apparatus defined in claim 9, wherein:

said phase grating comprises a surface relief pattern embossed in a transmissive material having an index-of-refraction of substantially 1.5, which surface relief pattern is in contact with air;

said given spectrum extends from 400 to 700 nanometers, d is substantially 1.4 micrometers, the physical amplitude a' of said rhomboid-shaped diffraction elements is substantially 2.07 micrometers, b is substantially 0.3 and $\beta$ is substantially 15°; and said detection and matrixing means includes first detection means for detecting said zero diffraction order output light beam to derive a first detected signal, second detection means for detecting said plus-one first diffraction order output light beam to derive a second detected signal, third detection means for detecting said minus-one first diffraction order output light beam to derive a third detected signal, and subtraction means for subtracting said second detected signal from said third detected signal to derive a difference signal, said first detected signal constituting a color signal representing green, said second detected signal constituting a color signal representing red and said difference signal constituting a color signal representing blue.

11. The apparatus defined in claim 10, wherein said apparatus comprises a color television camera.

* * * * *